US007267280B2

(12) United States Patent
Lubow

(10) Patent No.: US 7,267,280 B2
(45) Date of Patent: Sep. 11, 2007

(54) DIFFRACTIVE OPTICAL VARIABLE IMAGE INCLUDING BARCODE

(75) Inventor: Allen Lubow, Brooklyn, NY (US)

(73) Assignee: International Barcode Coporation, New York, NY (US)

( * ) Notice: Subject to any disclaimer, the term of this patent is extended or adjusted under 35 U.S.C. 154(b) by 0 days.

(21) Appl. No.: 11/069,579

(22) Filed: Mar. 1, 2005

(65) Prior Publication Data

US 2005/0199724 A1  Sep. 15, 2005

Related U.S. Application Data

(60) Provisional application No. 60/549,134, filed on Mar. 1, 2004.

(51) Int. Cl.
*G06K 7/10* (2006.01)
(52) U.S. Cl. .......................... 235/462.01; 235/462.02; 235/462.09; 235/462.16; 235/454; 235/457
(58) Field of Classification Search ........... 235/462.01, 235/462.02, 462.09, 462.16, 472.01, 454, 235/457, 494, 462.34; 164/4.1, 1–2, 6, 229
See application file for complete search history.

(56) References Cited

U.S. PATENT DOCUMENTS

| 4,316,665 | A | 2/1982 | Mochizuki et al. |
| 4,333,006 | A | 6/1982 | Gorin et al. |
| 4,339,168 | A | 7/1982 | Haines |
| 4,343,874 | A | 8/1982 | Haines |
| 4,364,627 | A | 12/1982 | Haines |

(Continued)

FOREIGN PATENT DOCUMENTS

AT   334117   12/1976

(Continued)

OTHER PUBLICATIONS

Fries, Eberhard-Ulrich Dr (DE004200746A1), Machine readable identification information in hologram bar code having fixed and variable code section formed by combination of two diffraction angle materials and blanked out section, Jul. 15, 1993.*

(Continued)

*Primary Examiner*—Kimberly D. Nguyen
(74) *Attorney, Agent, or Firm*—Davidson Berquist Jackson & Gowdey LLP

(57) ABSTRACT

An optically variable device (OVD) is provided that includes a barcode rendered from a three-dimensional barcode. To increase the readability of the barcode rendered in the OVD, the bars of the three-dimensional barcode may have tapered sidewalls and depths that are small compared to their heights and widths. The barcode may be rendered in the OVD such that it is viewable only at certain angles or using certain wavelengths of light. Also provided is a barcode of multiple portions where a portion is rendered in an OVD and another portion is otherwise provided (e.g., printed). Such a barcode may have portions that are readable as independent barcodes and are also readable together as a single, compound barcode. Also provided is a method where a plurality of OVDs with unique images are associated with products, e.g., packaged together, so that receipt of a package of products with non-unique images indicates counterfeiting.

19 Claims, 4 Drawing Sheets

U.S. PATENT DOCUMENTS

| | | | |
|---|---|---|---|
| 4,429,946 A | 2/1984 | Haines | |
| 4,547,002 A | 10/1985 | Colgate, Jr. | |
| 4,597,814 A | 7/1986 | Colgate, Jr. | |
| 4,684,795 A | 8/1987 | Colgate, Jr. | |
| 4,725,111 A | 2/1988 | Weitzen et al. | |
| 4,728,377 A | 3/1988 | Gallagher | |
| 4,778,262 A | 10/1988 | Haines | |
| 4,832,445 A | 5/1989 | Haines et al. | |
| 4,900,111 A | 2/1990 | D'Amato et al. | |
| 4,913,504 A | 4/1990 | Gallagher | |
| 4,921,319 A | 5/1990 | Mallik | |
| 4,933,120 A | 6/1990 | D'Amato et al. | |
| 4,969,700 A | 11/1990 | Haines | |
| 5,003,915 A | 4/1991 | D'Amato et al. | |
| 5,044,707 A | 9/1991 | Mallik | |
| 5,071,597 A | 12/1991 | D'Amato et al. | |
| 5,083,850 A | 1/1992 | Mallik et al. | |
| 5,085,514 A | 2/1992 | Mallik et al. | |
| 5,116,548 A | 5/1992 | Mallik et al. | |
| 5,128,779 A | 7/1992 | Mallik | |
| 5,142,383 A | 8/1992 | Mallik | |
| 5,145,212 A | 9/1992 | Mallik | |
| 5,194,971 A | 3/1993 | Haines | |
| 5,237,160 A | 8/1993 | Baba | |
| 5,245,170 A | 9/1993 | Aritake et al. | |
| 5,267,756 A | 12/1993 | Molee et al. | |
| 5,306,899 A * | 4/1994 | Marom et al. | 235/382 |
| 5,310,222 A | 5/1994 | Chatwin et al. | |
| 5,331,143 A | 7/1994 | Marom et al. | |
| 5,336,871 A | 8/1994 | Colgate, Jr. | |
| 5,380,047 A | 1/1995 | Molee et al. | |
| 5,393,099 A | 2/1995 | D'Amato | |
| 5,411,298 A | 5/1995 | Pollack | |
| 5,422,744 A | 6/1995 | Katz et al. | |
| 5,432,329 A | 7/1995 | Colgate, Jr. et al. | |
| 5,461,239 A * | 10/1995 | Atherton | 250/566 |
| 5,524,758 A | 6/1996 | Lupul | |
| 5,634,669 A | 6/1997 | Colgate, Jr. | |
| 5,644,412 A | 7/1997 | Yamazaki et al. | |
| 5,661,289 A | 8/1997 | Sasou et al. | |
| 5,772,248 A * | 6/1998 | Phillips | 283/91 |
| 5,786,587 A | 7/1998 | Colgate, Jr. | |
| 5,801,857 A | 9/1998 | Heckenkamp et al. | |
| 5,856,048 A | 1/1999 | Tahara et al. | |
| 6,086,708 A | 7/2000 | Colgate, Jr. | |
| 6,100,804 A | 8/2000 | Brady et al. | |
| 6,130,613 A | 10/2000 | Eberhardt et al. | |
| 6,147,662 A | 11/2000 | Grabau et al. | |
| 6,149,059 A | 11/2000 | Ackley | |
| 6,181,287 B1 | 1/2001 | Beigel | |
| 6,214,443 B1 | 4/2001 | Palmasi et al. | |
| 6,220,333 B1 * | 4/2001 | Cantwell | 164/4.1 |
| 6,259,369 B1 | 7/2001 | Monico | |
| 6,268,893 B1 | 7/2001 | O'Boyle et al. | |
| 6,280,544 B1 | 8/2001 | Fox et al. | |
| 6,280,891 B2 | 8/2001 | Daniel et al. | |
| 6,318,636 B1 | 11/2001 | Reynolds et al. | |
| 6,321,986 B1 * | 11/2001 | Ackley | 235/462.01 |
| 6,328,209 B1 | 12/2001 | O'Boyle | |
| 6,354,501 B1 * | 3/2002 | Outwater et al. | 235/462.01 |
| 6,415,978 B1 | 7/2002 | McAllister | |
| 6,436,483 B2 | 8/2002 | Palmasi et al. | |
| 6,523,750 B1 | 2/2003 | Dickson et al. | |
| 6,582,197 B2 * | 6/2003 | Coulson | 416/241 R |
| 6,609,728 B1 | 8/2003 | Voerman et al. | |
| 6,666,255 B2 * | 12/2003 | Cantwell | 164/98 |
| 2001/0005570 A1 | 6/2001 | Daniel et al. | |
| 2001/0012137 A1 | 8/2001 | Palmasi et al. | |
| 2001/0038451 A1 | 11/2001 | Jung et al. | |
| 2002/0018430 A1 | 2/2002 | Heckenkamp et al. | |
| 2002/0060659 A1 | 5/2002 | Matsuda et al. | |
| 2002/0067265 A1 | 6/2002 | Rodolph | |
| 2002/0075481 A1 | 6/2002 | Roustael | |
| 2002/0122878 A1 | 9/2002 | Kerns et al. | |
| 2003/0015591 A1 | 1/2003 | Chen | |
| 2003/0031861 A1 | 2/2003 | Reiter et al. | |
| 2003/0084305 A1 * | 5/2003 | Siegel et al. | 713/186 |
| 2004/0000787 A1 | 1/2004 | Vig et al. | |
| 2004/0020995 A1 | 2/2004 | Haneda et al. | |
| 2004/0027630 A1 | 2/2004 | Lizotte | |

FOREIGN PATENT DOCUMENTS

| | | |
|---|---|---|
| WO | WO 02/06059 A1 | 1/2002 |
| WO | WO 03/027952 A1 | 4/2003 |

OTHER PUBLICATIONS

Darin Painter, "The Visible Solution", FORMS Magazine, Jan. 1999, pp. 1-11, Document Management Industries Association.

International Search Report mailed Aug. 18, 2005 in International Application No. PCT/US2005/013124.

Written Opinion mailed Aug. 18, 2005 in International Application No. PCT/US2005/006564.

Written Opinion mailed Aug. 18, 2005 in International Application No. PCT/US2005/013124.

International Search Report, Date of Mailing: Aug. 18, 2005.

* cited by examiner

DIFFRACTIVE OPTICAL VARIABLE IMAGE INCLUDING BARCODE

CROSS-REFERENCE TO RELATED APPLICATIONS

This application claims the benefit of U.S. Provisional Patent Application No. 60/549,134, filed on Mar. 1, 2004, the entirety of which is hereby incorporated by reference into this application.

COPYRIGHT AND LEGAL NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

The invention relates generally to optically variable devices, such as diffractive optical variable images, and more particularly to optically variable devices including barcodes.

SUMMARY OF THE INVENTION

According to one embodiment of the invention, features and functions are provided for efficiently integrating a barcode with an optically variable device (OVD), such as a diffractive optical variable image (DOVI) indicia, on a substrate.

According to another embodiment of the invention, features and functions are provided for creating an OVD, such as a DOVI, having a barcode on a substrate. The term "diffractive optical variable image" as used herein may refer to any type of holograms including, for example, but not limited to a multiple plane hologram (e.g., 2-dimensional hologram, 3-dimensional hologram, etc.), a stereogram, and a grating image (e.g., dot-matrix, pixelgram, exelgram, kinegram, etc.).

According to another embodiment of the invention, a method is provided for creating an OVD, such as a DOVI, having a 3-dimensional barcode on a substrate, wherein each bar of the barcode includes a front portion, a back portion, and side-walls. The characteristics of the bars of the 3-dimensional barcode provide a proper reflection and/or refraction of a light, thereby enabling or improving a scannability of the barcode. In one embodiment, the surface area of the front portion of the bar is larger than the surface area of the back portion of the bar. In another embodiment, the edges of the bar are sharpened to a pre-determined sharpness. In yet another embodiment, the side-walls are tapered or slanted toward a central axis of the bar. In an additional embodiment, the bars are shortened to a pre-determined depth.

According to another embodiment of the invention, a method is provided for creating a barcode and an OVD, such as a DOVI, on a first substrate (e.g., plastic, metal, etc.), said OVD embossed on said first substrate, said barcode including a first portion and a second portion, wherein said first portion of said barcode is embossed on said OVD and said second portion of said barcode is embossed or printed on a second substrate (e.g., a white plastic substrate for background, etc.). In one embodiment, said second substrate is embossed on said first substrate. In some embodiments, said second portion of said barcode is etched on said second substrate (e.g., a white plastic substrate for background, etc.).

According to another embodiment of the invention, a method is provided for creating a plurality of barcodes and an OVD, such as a DOVI, on a first substrate (e.g., plastic, metal, etc.), said OVD embossed on said first substrate, said plurality of barcodes including a first barcode and a second barcode, wherein said first barcode is embossed on said OVD and said second barcode is embossed or printed on a second substrate (e.g., a white plastic substrate for background, etc.). In one embodiment, said second substrate is embossed on said first substrate. In another embodiment, said second barcode is etched on said second substrate (e.g., a white plastic substrate for background, etc.). In some embodiments, a first barcode is scannable only at a first pre-determined angle and a second barcode is scannable only at a second pre-determined angle, wherein the first and second pre-determined angles are angles between an axis of a scanner and an axis of one of the first and second barcodes.

According to another embodiment of the invention, a method is provided for creating a plurality of OVDs, such as DOVIs, on a substrate (e.g., plastic, metal, etc.), each of said plurality of OVDs including an unique indicia, for example, a barcode indicia, said method comprising simultaneously embossing said plurality of OVDs on said substrate (e.g., plastic, metal, etc.), separating said each of said plurality of OVDs along with its corresponding substrate portion from the each other OVD, and attaching said separated OVD to a product (e.g., credit card).

According to an embodiment of the invention, an optically variable device is provided that includes a first bar code. The first bar code is rendered in the optically variable device based on a second bar code, wherein the second bar code is a three-dimensional bar code including a plurality of bars each having a front portion, a rear portion, and side-walls formed therebetween, wherein the distance between the front portion and rear portion of each bar of the second bar code is less than the height and width of the front portion of the respective bar of the second bar code.

In another embodiment of the invention, the distance between the front portion and rear portion of each bar of the second bar code is less than half of the width of the front portion of the respective bar of the second bar code.

According to another embodiment of the invention, the optically variable device is contained within a carrier, and the first bar code comprises information associated with an object to which the carrier attaches.

In another embodiment of the invention, the information encodes a global trade identification number.

According to another embodiment of the invention, an optically variable device is provided that includes a first bar code, wherein the first bar code is rendered in the optically variable device based on a second bar code, wherein the second bar code is a three-dimensional bar code including a plurality of bars each having a front portion, a rear portion, and sidewalls formed therebetween, and wherein the front portion of each bar of the second bar code has a first area and the rear portion of the respective bar has a second area smaller than the first area of the respective bar.

In another embodiment of the invention, the sidewalls of each bar of the second bar code are tapered.

According to another embodiment of the invention, the optically variable device is contained within a carrier, and the first bar code comprises information associated with an object to which the carrier attaches.

In another embodiment of the invention, a machine readable symbol is provided that includes a first portion and a second portion. The first portion of the machine readable symbol is rendered in an optically variable device, wherein the optically variable device is contained within a carrier associated with a substrate. The second portion of the machine readable symbol is provided on a surface associated with the substrate. And the first and second portions can be read as a single machine readable symbol.

According to another embodiment of the invention, the first and second portions include bar codes.

In another embodiment of the invention, the second portion encodes information that supplements information encoded in the first portion.

In another embodiment of the invention, the first and second portions include linear bar codes.

According to another embodiment of the invention, he first portion includes a linear bar code and the second portion includes a two dimensional bar code.

In another embodiment of the invention, a method of generating a machine readable symbol is provided. In the method, a first portion of the machine readable symbol is provided in an optically variable device that is included in a carrier. The carrier is associated with a substrate. A second portion of the machine readable symbol is provided on a surface associated with the substrate so that the first and second portions can be read as a single machine readable symbol.

In another embodiment of the invention, the first portion encodes first information and the second portion encodes second information that supplements the first information.

According to another embodiment of the invention, the substrate is associated with a product.

According to another embodiment of the invention, a counterfeit prevention means is generated by encrypting the second information based on the first information.

According to another embodiment of the invention a counterfeit prevention means is generated by assigning a unique number to the second portion, wherein the unique number is derived from the first information.

In another embodiment of the invention, the carrier is affixed to the substrate and the second portion is provided adjacent to first portion so that a space is provided between the first and second portions, wherein the space reduces scanning errors associated with a scanner device for reading the machine readable symbol formed by the first and second portions.

According to another embodiment of the invention the first portion encodes data linking the first portion to the second portion.

In another embodiment of the invention, the first portion is undetectable when the optically variable device having the first portion is viewed using light of a first wavelength range and at a first range of viewing angles, and the first machine readable symbol is detectable when the optically variable device having the first machine readable symbol is viewed using light of a second wavelength range and at a second range of viewing angles.

According to another embodiment of the invention, a method is provided for manufacturing optically variable devices for facilitating the authentication of products. In the method, a plurality of optically variable devices are generated, each of which includes a distinct image from a set of unique images. A plurality of carriers is created each of which includes one of the plurality of optically variable devices. Each of the plurality of carriers is associated with a distinct product from a set of products such that the authenticity of the set of products can be determined based on the number of products of the set associated with carriers that include optically variable devices that include non-unique images.

In another embodiment of the invention, the generating of a plurality of optically variable devices comprises recording the plurality of optically variable devices in an embossing plate. The plurality of carriers are created using the embossing plate.

According to another embodiment of the invention, the set of unique images includes a set of sequential images.

In another embodiment of the invention, the set of sequential images includes a set of sequential numbers.

According to another embodiment of the invention, each image from the set of unique images includes a machine readable symbol.

According to another embodiment of the invention, each image from the set of unique images includes a bar code.

In an embodiment of the invention, an optically variable device is provided that includes a first bar code, wherein the first bar code is rendered in the optically variable device based on a second bar code. The second bar code is a three-dimensional bar code including a plurality of bars each having a front portion, a rear portion, and sidewalls formed therebetween, wherein the sidewalls have a color not detectable by a barcode scanner.

Other objects and features of the present invention will become apparent from the following detailed description considered in connection with the accompanying drawings that disclose embodiments of the present invention. It should be understood, however, that the drawings are designed for purposes of illustration only and not as a definition of the limits of the invention.

BRIEF DESCRIPTION OF THE FIGURES

The invention is illustrated in the figures of the accompanying drawings, which are meant to be exemplary and not limiting, and in which like references are intended to refer to like or corresponding parts.

DETAILED DESCRIPTION

Figure 1:
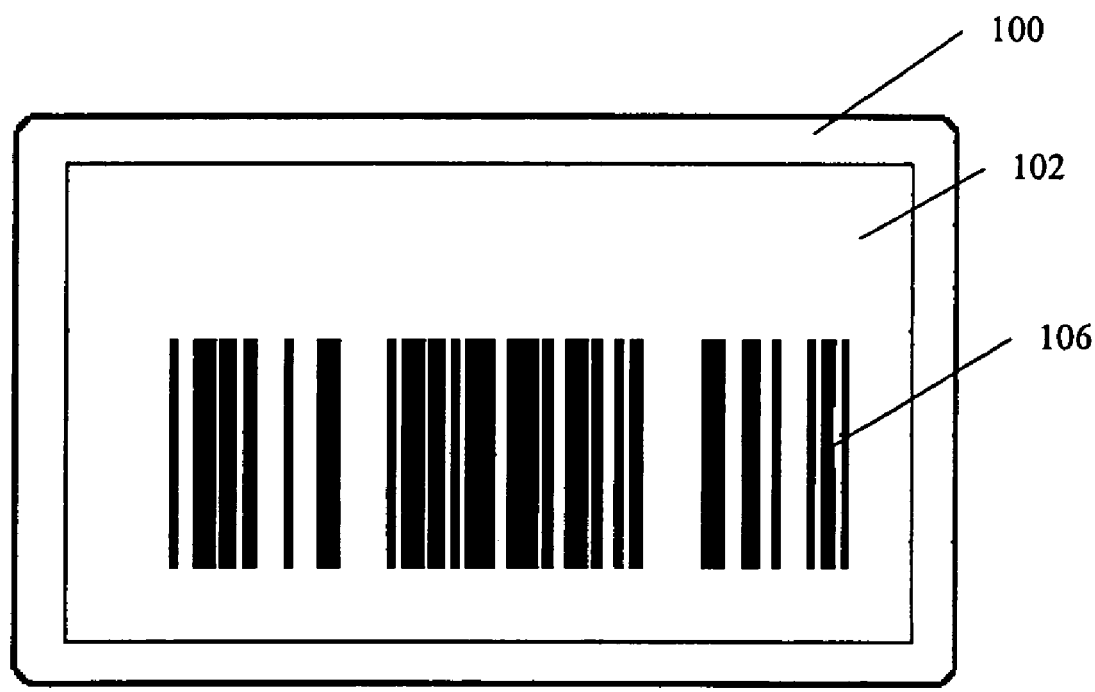
FIG. 1 is an example of a carrier containing an OVD (e.g., a DOVI) including a holographic image of a barcode, according to one embodiment of the invention.

As shown in FIG. 1, according to one embodiment of the invention, an optically variable device (OVD), such as a DOVI, is contained within a carrier 102. The carrier 102 may be any object capable of holding an OVD or a DOVI, such as, for example, a photographic plate or a plastic label. The OVD contained within the carrier 102 includes a holographic image 106 of a barcode. The carrier 102 may be affixed to a substrate 100, which may be any object or surface of an object onto which a carrier may be affixed, such as, for example, a plastic card (e.g., an identification card, a credit or debit card, or a product tag), a metal surface, or the surface of a container. The carrier 102 may be affixed to the substrate 100 through a variety of techniques, such as, for example, by using an adhesive or by laminating the carrier 102 to the substrate 100.

Figure 2:
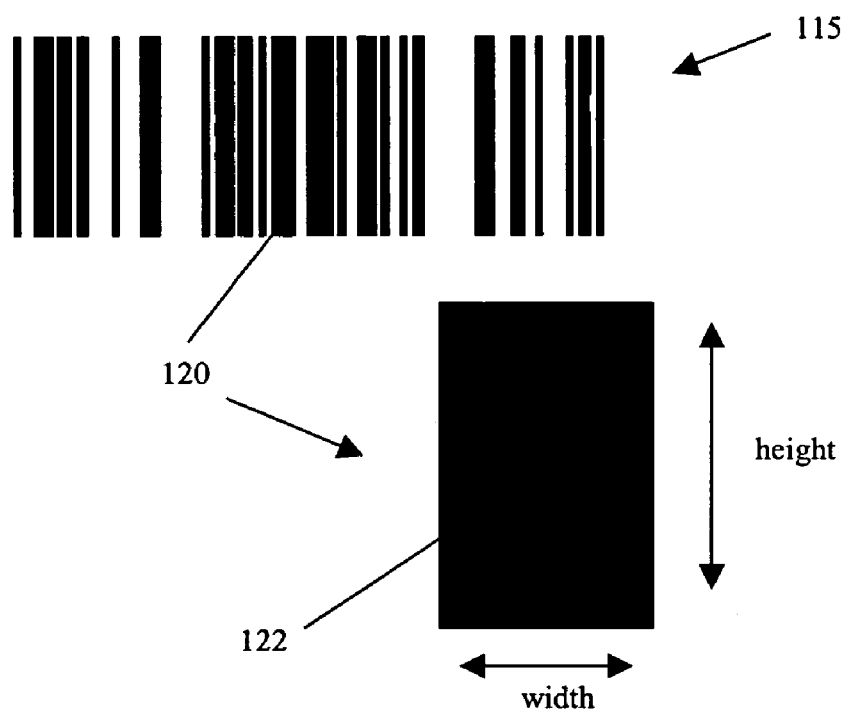
FIG. 2 is an example of a barcode as used in an embodiment of the invention.

The holographic image 106 is a holographic rendering of a barcode 115, shown in FIG. 2. Barcode 115 may be a two-dimensional barcode in which case the holographic image 106 rendered from it will not have a parallax effect when viewed from different angles. To be capable of being rendered as a holographic image with such a parallax effect, if so desired, barcode 115 must be given depth so that if barcode 115 were a linear barcode it would appear as a picket fence with each bar 120 appearing as a slat of the fence. The holographic image 106 of barcode 115 may be created through known techniques. For example, barcode 115 may be created as an electronic image which is then rendered as holographic image 106 through known digital holographic techniques.

To maximize the readability of a holographic image 106 of a barcode 115 (e.g., the ability of the holographic image to be accurately read by a barcode scanner to thereby obtain the information encoded in the barcode rendered in the hologram), certain characteristics of the barcode and the holographic image rendered from the barcode may be manipulated. For example, as is known in the art, contrast between bars and spaces and edge quality are two characteristics of barcodes that determine their readability. With regard to contrast, colors may be chosen for the bars and spaces of the barcode 115 (e.g., black, cyan, or blue for bars and white, red, or yellow for spaces) so that when barcode 115 is rendered into holographic image 106, there is at least a 50% difference in contrast between the bars and spaces in the holographic image 106 of the barcode. For example, a black color known as "Optical Black" offered by Applied Optical Technologies, Inc. may be used for the bars.

With regard to edge quality, several techniques may be used to improve this characteristic of the holographic rendering 106 of barcode 115. For example, the depth of each bar 120 of barcode 115 may be kept very small compared with either the width or height of the bar. For example, the depth may be kept to half the size of the width or less. This will increase the sharpness of the edges of holographic image 106 rendered from barcode 115 and thereby increase the readability of the holographically rendered barcode.

Figure 3:
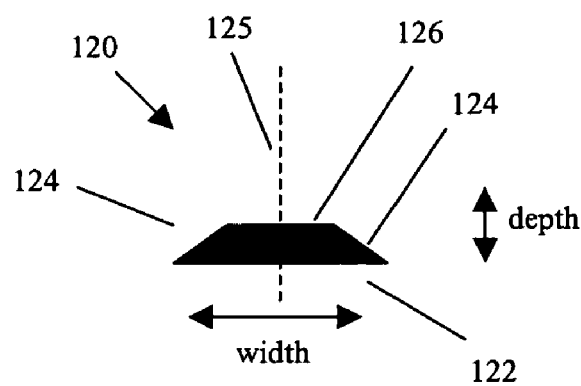
FIG. 3 is a top view a bar of a barcode as used in an embodiment of the invention.
Figure 4:
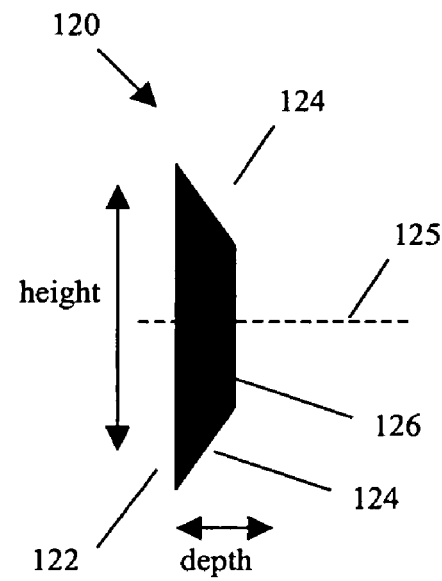
FIG. 4 is a side view a bar of a barcode as used in an embodiment of the invention.

Another way to increase the edge quality of the holographic rendering 106 of barcode 115 would be to give barcode 115 tapered side-walls. Referring again to FIG. 2, an exemplary bar 120 of barcode 115 is expanded to show the front side 122 (e.g., the side normally read by a scanner) of the bar. FIGS. 3 and 4 present top and side views, respectively, of bar 120 and show the rear side 126 and side walls 124 of bar 120. It should be noted that FIGS. 3 and 4 are not drawn to scale. As shown in FIGS. 3 and 4, the side walls 124 are tapered toward a central axis 125 of bar 120. Tapering the side-walls of barcode 115 in the manner described above increases the sharpness of the edges of holographic image 106 rendered from barcode 115 which, in turn, increases the edge quality and readability of the holographic rendering 106 of barcode 115.

In another embodiment, different colors may be used increase the readability of the holographic rendering 106. For example, if a color not typically readable by barcode scanners (e.g., white, red, and yellow) is chosen for the sidewalls of barcode 115 and a different unreadable color used for the background, then, in the holographic rendering 106, the sidewalls would be viewable, e.g., by a human observer, but would not be scannable by a barcode scanner. Thus, barcode 115 could have bars with sidewalls greater than half their width and the holographic rendering 106 could still be accurately scanned as a barcode.

Although in the figures discussed above barcode 115 is shown as a linear barcode, it should be understood that barcode 115 may include other machine readable indicia including, for example, two-dimensional barcodes and composite barcodes, e.g., RSS barcodes.

The barcode 115 may be used to encode a variety of information. For example, where carrier 102 and substrate 100 are a plastic product identification label affixed to plastic tag, respectively, barcode 115, of which image 106 is a holographic rendering, may encode the GTIN (Global Trade Identification Number) of the product to which the product ID label is to be attached. For information purposes, the GTIN consists of a packaging identifier, manufacturing number, product number and check digit. It conforms to the numbering system set up by the Uniform Code Council and the European Article Numbering Association.

Product ID labels containing OVDs (e.g., DOVIs) that include holographic images of barcodes provide benefits including enhanced authentication properties. For example, without the use of barcodes, a product ID label may contain an OVD (e.g., a DOVI) that includes an image of a symbol related to or a trademark of the product manufacturer. A counterfeiter able to duplicate the label could place it on any products and then pass off those products as being from the manufacturer. However, for a product ID label with an OVD (e.g., a DOVI) including a holographic image of a barcode that encodes a GTIN corresponding to a particular product, even if a counterfeiter were able to duplicate the label, the bogus label could only be used with products corresponding to the encoded GTIN or risk easy detection.

According to another embodiment of the invention, the holographic image 106 of barcode 115 may be formed so that the image 106 is only visible at a certain angle or range of angles. One way in which this may achieved is through the three-dimensional appearance of holographic image 106. For example, as is known, certain barcode formats require bars of a barcode to be a certain width in order for the barcode to be properly scanned. Then, where barcode 115 is three-dimensional, the dimensions of the bars could be chosen so that the holographic image 106 rendered from barcode 115 would be scannable only at a certain angles. For instance, assume a given barcode format requires a bar width of 1⅛ inches. The bars of barcode 115 could be given a width of 1 inch with sidewalls of ¼ inch and where the sidewalls are of a color typically recognized by barcode scanners (e.g., blue or black). Consequently, a holographic image 106 rendered from barcode 115 when viewed at no angle, e.g., so that only the front side is viewable, would present a width of 1 inch and would not be scannable. However, when holographic image 106 is viewed at an angle equal to or greater than a certain angle, enough of the sidewall is viewable so that the viewable width of the front side plus the viewable sidewall would present a total of 1⅛ inches or more and the image 106 would thus be scannable.

Alternatively, or in addition, the holographic image 106 of barcode 115 may be formed so that the image 106 is only visible at a certain wavelength or range of wavelengths of light. Conversely, the holographic image 106 of barcode 115 may be formed so that the image 106 disappears at one or a range of predetermined angles or wavelengths. Such features provide benefits including enhanced security and authentication properties since the angle(s) or wavelength(s) at which the holographic image 106 of barcode 115 should be detected or should not be detected may be predetermined and shared only with authorized personnel.

Figure 5:
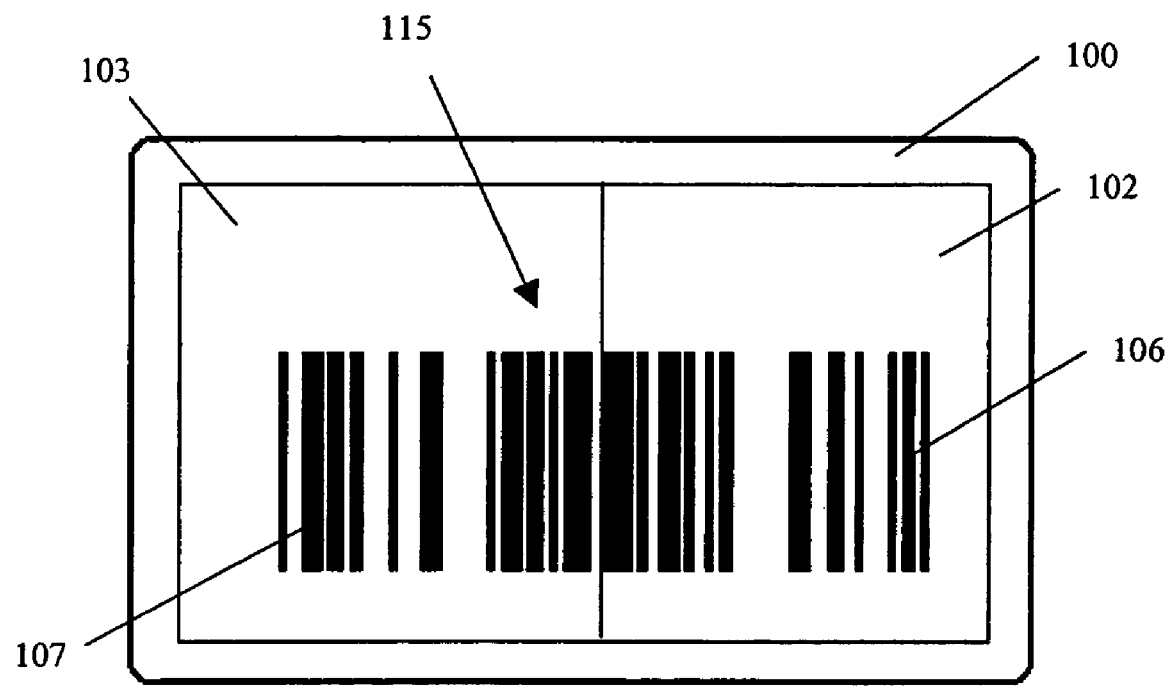
FIG. 5 is an example of barcode a portion of which is rendered in a hologram and a portion of which is provided through non-holographic means according to one embodiment of the invention.

FIG. 5 shows another embodiment of the invention in which a barcode is partially rendered in a holographic image and partially provided through other known means, such as thermal or ink printing or laser etching. A barcode 115, e.g., a linear barcode, may be split into two portions with one portion rendered into a holographic image 106 contained in a carrier 102 that is then affixed to a substrate 100, as described above. On an area 103 abutting the carrier 102, the other portion 107 of the barcode 115 may be provided by other means as mentioned above. The area 103 may include any surface onto which a barcode may be created. For example, area 103 may be formed from part of carrier 102. One portion of carrier 102 may include the holographic image 106 and the other portion may be sprayed with ink of a color suitable for the background of a barcode, e.g., white, red, or yellow. Alternatively, area 103 may be a paper label of a suitable background color affixed to substrate 100. Also, area 103 may be substrate 100 itself.

In this embodiment, the carrier 102 including the holographic image 106 of a portion of barcode 115 may be produced and affixed to substrate 100 in a first step. Area 103 may be formed at the same time as carrier 102 (e.g., where area 103 is the substrate 100 or a portion of carrier 102) or may be added later (e.g., where area 103 is a paper label). At a later time, the remaining portion 107 of barcode 115 may provided onto area 103, e.g., printed or etched. Where etching is used, area 103 may include a first layer suitable to form the bars of a barcode over a second layer suitable for the background of a barcode. A suitable tool, e.g., a laser, is then used to etch the spaces of the portion of barcode 115 from the first layer of area 103.

For efficiency of cost and time, it may be desirable to produce the carrier 102 including holographic image 106 in large quantities with each portion of barcode 115 contained therein being identical. However, since the remaining portion of barcode 115 is provided later through less costly and time intensive non-holographic means, the remaining portion of barcode 115 may be used to encode additional information available only after the creation of the carriers 102 including the holographic images 106.

For example, barcode 115 could be a linear barcode format having a user definable portion, such as Code 39. The non-user definable portion could be used to encode information likely not to change, e.g., the name of a performer on tour, and this non-user definable portion could be rendered as the holographic images 106 contained in carriers 102. The user definable portion of the barcode could be used to encode information likely to change, e.g., the times and venues of particular performances on the tour. This changing information could be provided on the areas 103 later as needed, e.g., a week before a particular performance.

Figure 6:
FIG. 6 is another example of barcode a portion of which is rendered in a hologram and a portion of which is provided through non-holographic means according to one embodiment of the invention.

In the embodiment of the invention where a barcode 115 has one portion rendered as a holographic image and another portion provided through non-holographic means, barcode 115 may also comprise a two-dimensional barcode or a composite RSS barcode as shown in FIG. 6. As described above, a portion of the RSS barcode 115 is rendered in a holographic image 106 contained in a carrier 102 and the remaining portion 107 is provided onto area 103 through non-holographic means. In the example shown in FIG. 6, the linear portion of RSS barcode 115 is rendered as the holographic image 106 while the remaining portion 107 to be provided onto area 103 through non-holographic means is the two-dimensional portion of RSS barcode 115. Also, a space may be provided between the two portions 106 and 107 to help reduce scanning errors.

RSS has twelve different formats, each of which may consist of a linear portion with a two-dimensional composite code printed above which can hold an additional portion of data; up to 2300 additional characters of information. In the RSS-14, RSS Limited, RSS Stacked, RSS Omni-directional, RSS Truncated, UPC, Code 128or EAN barcode may be used as the linear lower portion of the RSS barcode to encode the GTIN (Global Trade Identification Number) plus linkage characters which alert the scanners to the fact that another portion of the barcode, the two-dimensional portion, exists and the scanner will seek out that additional information before finishing reading.

As mentioned above in connection with FIG. 5, the portion 107 of RSS barcode 115 may encode additional information available only after the holographic images 106 and carriers 102 are produced. For example, one piece of additional information that can be added to the GTIN product number (that may be encoded in holographic image 106) is the time and place of manufacture. Another example might include a unique serial number, individual product identifier, or secret code which is a derivative of the other information on the label. In so doing, the time that a counterfeiter has to replicate the label is now reduced to a measurable window of time, for if the label which says that the time of manufacture was 'A' and the expected use of such an object is one week, then a label arriving with a printed time of manufacture would either fit into the supply chain scheme or not for only one week. The same could be said for place of manufacture or point of distribution or the like. Further, the encryption of this information adds another layer of security to the authenticity of the label in that it would be so much more difficult to counterfeit the label if one not only had to reproduce the manufacturing process of the label but also needed to know the encryption algorithms. Further, such encryption algorithms could change periodically throughout the manufacturing process.

It should be noted that when the remaining portion 107 of barcode 115 (linear, two-dimensional, or RSS) is provided onto area 103 and substrate 100, the remaining portion 107 must align properly with the other portion rendered as holographic image 106 so that the combined portions 106 and 107 can be scanned correctly as a barcode. Also, the barcode characteristics (e.g., wide narrow ratio, edge quality, X dimension, contrast, and bar width reduction) of each portion 106 and 107 must be conserved so that the combined portions 106 and 107 scan correctly as a single barcode.

According to another embodiment of the invention, a manufacturing method is provided for creating a plurality of unique holographic images. A plate large enough to accommodate a plurality of holographic images is used. A plurality of unique holographic images are then recorded onto the plate. For example, the images may include a series of human readable numbers, e.g., 1–400, or a series of unique barcodes encoding a series of numbers. Once the plurality of images is recorded onto the plate, the plate is used to mass produce groups of carriers 102 with the holographic images. Thus, groups of carriers 102 may be produced in mass from the plate where, within each group, the holographic images are unique.

During packaging, groups of carriers 102 having a particular sequence (e.g., 1–50, 37–57, or 264–284) are likely to be packed in the same container. Consequently, counterfeiting activity could be easily detected where all or many of the carriers 102 contained in a package carried the same number rather than sequential numbers.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modifications are intended to be included within the scope of the invention. Except to the extent necessary or inherent in the processes themselves, no particular order to steps or stages of methods or processes described in this disclosure, including the Figures, is implied. In many cases the order of process steps may be varied without changing the purpose, effect or import of the methods described.

What is claimed is:

1. A composite bar code, comprising:
a first portion of the composite bar code formed as part of a hologram; and
a second portion of the composite bar code formed not as a hologram, wherein the first and second portions of the composite bar code are adjacent so that the first and second portions can be read as a single machine readable bar code,
wherein the first portion of the composite bar code is a three-dimensional bar code including a plurality of bars each having a front portion, a rear portion, and sidewalls formed there between; and
wherein the front portion of each bar of the first portion of the composite bar code has a first area and the rear portion of the respective bar has a second area smaller than the first area of the respective bar.

2. The composite bar code according to claim 1, wherein the hologram comprises a multiple plane hologram.

3. The composite bar code according to claim 2, wherein the multiple plane hologram comprises a two-dimensional hologram.

4. The composite bar code according to claim 2, wherein the multiple plane hologram comprises a three-dimensional hologram.

5. The composite bar code according to claim 1, wherein second portion of the composite bar code is formed by at least one of printing and etching.

6. The composite bar code according to claim 1, wherein at least a portion of the single machine readable bar code encodes a global trade identification number.

7. The composite bar code according to claim 1, wherein the sidewalls of each bar of the first portion of the composite bar code are tapered.

8. A composite bar code as claimed in claim 1, wherein the sidewalls have a color not detectable by a barcode scanner.

9. A machine readable symbol comprising:
adjacent first and second portions;
wherein the first portion of the machine readable symbol is rendered in a hologram associated with a substrate;
wherein the second portion of the machine readable symbol is not rendered in a hologram and is provided on a surface associated with the substrate; and
wherein the first and second portions can be read as a single machine readable symbol,
wherein the first portion of the machine readable symbol is a three-dimensional bar code including a plurality of bars each having a front portion, a rear portion, and sidewalls formed there between; and
wherein the front portion of each bar of the first portion of the machine readable symbol has a first area and the rear portion of the respective bar has a second area smaller than the first area of the respective bar.

10. The machine readable symbol according to claim 9, wherein the second portion encodes information that supplements information encoded in the first portion.

11. A method of generating a machine readable symbol, comprising:
providing a first portion of the machine readable symbol in a hologram associated with a substrate; and
providing a second portion of the machine readable symbol on a surface associated with the substrate so that the first and second portions can be read as a single machine readable symbol, wherein the second portion of the machine readable symbol is not a hologram and is adjacent the first portion,
wherein the first portion of the machine readable symbol is a three-dimensional bar code including a plurality of bars each having a front portion, a rear portion and sidewalls formed there between; and
wherein the front portion of each bar of the first portion of the machine readable symbol has a first area and the rear portion of the respective bar has a second area smaller than the first area of the respective bar.

12. The method according to claim 11, wherein the first portion encodes first information; and
wherein the second portion encodes second information that supplements the first information.

13. The method according to claim 12, comprising generating a counterfeit prevention means by encrypting the second information based on the first information.

14. The method according to claim 12, comprising generating a counterfeit prevention means by assigning a unique number to the second portion, wherein the unique number is derived from the first information.

15. The method according to claim 11, wherein the substrate is associated with a product.

16. The method according to claim 11, wherein a space is provided between the first and second portions, wherein the space reduces scanning errors associated wit a scanner device for reading the machine readable symbol formed by the first and second portions.

17. The method according to claim 11, wherein the first portion encodes data linking the first portion to the second portion.

18. The method according to claim 11, wherein the first portion is undetectable when using light of a first wavelength range; and
wherein the first portion is detectable when using light of a second wavelength.

19. The method according to claim 11, comprising affixing the first portion to a product.

* * * * *